United States Patent [19]

Himoto

[11] Patent Number: 6,055,074
[45] Date of Patent: Apr. 25, 2000

[54] COLOR CORRECTING APPARATUS

[75] Inventor: Etsuko Himoto, Fukuoka, Japan

[73] Assignee: Matsushita Electric Industrial Co., Ltd., Osaka, Japan

[21] Appl. No.: 09/058,957

[22] Filed: Apr. 13, 1998

[30] Foreign Application Priority Data

Apr. 15, 1997 [JP] Japan .................................. 9-097021

[51] Int. Cl.⁷ ................................. G03F 3/08; G06K 9/00
[52] U.S. Cl. .......................................... 358/518; 382/167
[58] Field of Search ................................... 358/504, 517, 358/518, 525, 534, 535, 536; 395/109; 382/162, 167

[56] References Cited

U.S. PATENT DOCUMENTS

| | | | |
|---|---|---|---|
| 5,610,732 | 3/1997 | Komatsu | 358/525 |
| 5,659,406 | 8/1997 | Imao et al. | 358/525 |
| 5,664,072 | 9/1997 | Ueda et al. | 358/518 |
| 5,801,853 | 9/1998 | Yamada et al. | 358/504 |
| 5,809,213 | 9/1998 | Bhattacharjya | 358/504 |

*Primary Examiner*—Kimberly A. Williams
*Attorney, Agent, or Firm*—Stevens, Davis, Miller & Mosher, L.L.P.

[57] ABSTRACT

In a color correcting apparatus, transformation errors in an entire color space can be uniformly reduced in response to a characteristic of an input/output appliance, and a high precision color correction can be achieved. A first reference table is formed by storing input color signals produced by reading a reference color chip by using a color image scanner in correspondence with measurement values produced by measuring the reference color chip by employing a calorimeter. A calculation is made of a transformation coefficient for transforming input color signals into measurement values based on the input color signals close to lattice points defined in a color space, and also the measurement values corresponding thereto. The color data of the respective lattice points are corrected by using the transformation coefficient. Then, a second reference table is formed by storing the color data of the lattice points in correspondence with the corrected color data of the lattice points. The color correction process operation is performed for the image data entered from the image input apparatus with employment of the second reference table.

3 Claims, 8 Drawing Sheets

FIG. 3

| SCANNER READ VALUES $(R_{si}, G_{si}, B_{si})$ | MEASUREMENT VALUES $(R_{mi}, G_{mi}, B_{mi})$ |
|---|---|
| $(R_{s1}, G_{s1}, B_{s1})$ | $(R_{m1}, G_{m1}, B_{m1})$ |
| $(R_{s2}, G_{s2}, B_{s2})$ | $(R_{m2}, G_{m2}, B_{m2})$ |
| $(R_{s3}, G_{s3}, B_{s3})$ | $(R_{m3}, G_{m3}, B_{m3})$ |
| $(R_{s4}, G_{s4}, B_{s4})$ | $(R_{m4}, G_{m4}, B_{m4})$ |
| ⋮ | ⋮ |

~5

○ — 6
× — 7

(a) COLOR SPACE PRODUCED
BY READING REFERENCE
COLOR CHIP BY IMAGE SCANNER (b) COLOR SPACE PRODUCED
BY MEASURING REFERENCE
COLOR CHIP BY COLORIMETER (a) COLOR SPACE OF LATTICE POINT DATA FOR CONSTITUTIING BASIS OF COLOR CORRECTION (b) COLOR SPACE OF CORRECTED DATA FOR CONSTITUTIING BASIS OF COLOR CORRECTION (a) COLOR SPACE PRODUCED BY READING REAL IMAGE BY IMAGE SCANNER (b) COLOR SPACE OF CORRECTED OUTPUT DATA

COLOR CORRECTING APPARATUS

BACKGROUND OF THE INVENTION

1. Field of the Invention

The present invention is related to a color correcting apparatus for correcting a color reproduction characteristic of a color input/output appliance, and for converting a color image signal into color image data used to form a color image.

2. Description of the Related Art

In color input/output appliances, corrections are made in accordance with color reproduction characteristics of the respective appliances, and thereafter color signals are inputted, or outputted. FIG. 10 is an explanatory diagram for explaining input signal processing operation by a conventional color image scanner. In this color image scanner, an input process operation 8 is carried out by a color CCD (charge-coupled device). The color CCD color-separates a color image of an original to output the color-separated color image as R (red), G (green), B (blue) signals. In a shading correction process operation 9, the respective levels of the entered R, G, B signals are regulated. Furthermore, in a line correction process operation 10, color shifts (deviation) are corrected which are caused by positional differences in the respective R, G, B color CCDs with respect to the original. In addition, in a color correction process operation 11, a color correction is carried out so as to correct color difference from the image of the original, which are caused by the characteristics of the lamps of the color image scanner and of the color CCDs. In the color correction process operation 11, the inputted R, G, B signals are transformed by way of a transformation matrix of 3-row by 3-column, so that corrected R', G', B' signals are produced. The transformation matrix (transformation coefficient) of 3-row by 3-column is employed so as to correct the color differences between the image and the original, which are caused by the characteristic of the color image scanner. It should be noted that the R', G', B' signals correspond to the NTSC-R, G, B signals ruled in a CRT (cathode-ray tube). The color-corrected R', G', B' signals are outputted to an image processing apparatus connected to the color image scanner.

As explained above, in the case that the color correction is carried out with employment of the linear interpolation by a single transformation matrix, or a single transformation formula, the color correction would become difficult when the characteristic of the color input/output appliance is nonlinear. There is such a problem that when the color correction is carried out with employment of a single transformation formula, this color correction cannot be performed in such a manner that the transformation errors become uniform over the entire color space.

The present invention has an object to provide a color correcting apparatus capable of uniformly reducing transformation errors in an entire color space in response to a characteristic of an input/output appliance, and also capable of executing a color correction in high precision.

SUMMARY OF THE INVENTION

A color correcting apparatus, according to an aspect of the present invention, is featured by such a color correcting apparatus for correcting color data of an image inputted from an image input apparatus for reading a color image in accordance with a reading characteristic of said image input apparatus, comprising; calculating means for calculating a transformation coefficient used to transform input data of a reference color into normal data based upon the input data of the reference color and the normal data indicative of a reference color of a reference color chip, said input data of the reference color being produced by reading the reference color chip having the reference color located near a lattice point defined within a color space by employing said image input apparatus; lattice point correcting means for correcting the color data at the lattice point of said color space by using said transformation coefficient; and color correcting means for correcting the color data of the image inputted from said image input apparatus with employment of the corrected color data of the lattice point.

In accordance with the color correcting apparatus of the present invention, the correction coefficient is set to each of the color data about the lattice point of the color space. As a result, the color correction errors can be reduced over the entire color space. As a consequence, it is possible to realize the high precision color correction.

Furthermore, in accordance with the color correcting apparatus of the present invention, the correction coefficient is set to each of the color data about the lattice point of the color space. As a result, the color correction errors can be reduced over the entire color space. As a consequence, it is possible to realize the high precision color correction.

Furthermore, in accordance with the color correcting apparatus of the present invention, the transformation coefficients are newly calculated only when the characteristic change caused by the aging change of the image input apparatus exceed a certain range. As a consequence, it is possible to omit such a process operation for sequentially calculating the transformation coefficient due to a very unstable characteristic of the image input apparatus. Thus, the color correction can be effectively performed.

Moreover, in accordance with the color correcting apparatus of the present invention, the correction coefficients can be set every preselected region within a color space. The color correction can be done in high precision in response to the characteristic of the image input apparatus.

BRIEF DESCRIPTION OF THE DRAWINGS

A more complete understanding of the teachings of the present invention may be acquired by referring to the accompanying figures, in which:

FIG. 3 indicates a structural diagram of a first reference table;

DESCRIPTION OF THE PREFERRED EMBODIMENT

Referring now to drawings, various embodiments of the present invention will be described.

Figure 1A:
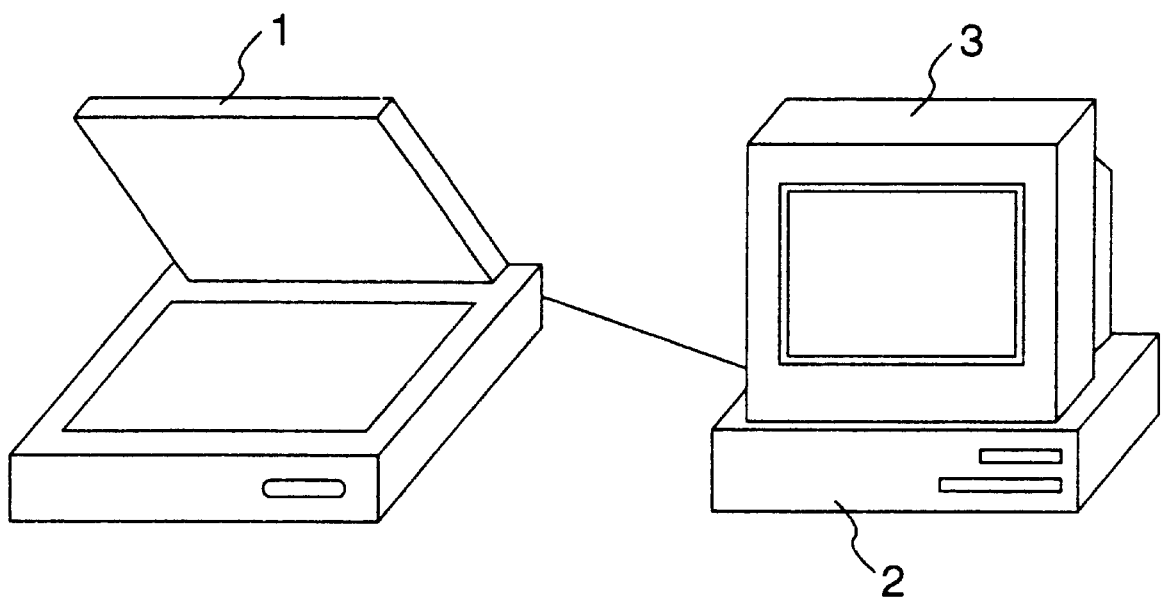
FIG. 1A illustratively shows an arrangement of a color image input/output apparatus according to a first embodiment of the present invention.

FIG. 1A schematically shows an arrangement of a color image input/output apparatus according to a first embodiment of the present invention. This color image input/output apparatus is arranged by a color image scanner 1 and a computer 2. The color image scanner 1 reads a color image of an original to produce a color input signal, and then supplies this color input signal to the computer 2. The computer 2 acquires the color input signal, color-corrects the color input signal derived from the color image scanner 1 in such a manner that the color image of this color input signal is matched to the color image of the original, and also displays the color-corrected color image on a color display 3.

Figure 2:
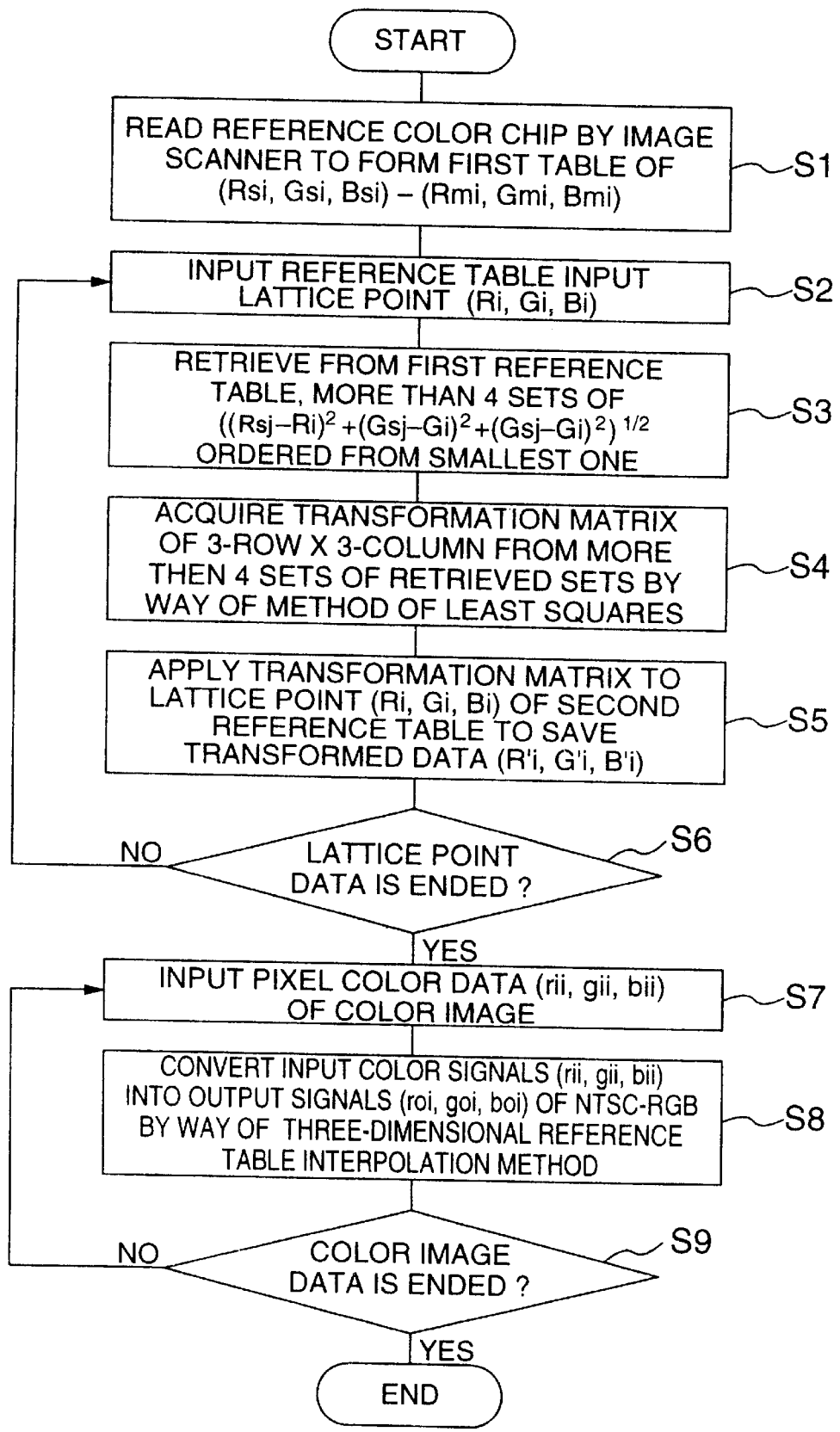
FIG. 2 is a flow chart for describing operations of a color correcting apparatus.

A color correcting apparatus for correcting the colors of the color input signal is constituted by a software under control of a CPU (central processing unit) of the computer 2. FIG. 2 is a flow chart for describing operations of the color correcting apparatus. Referring now to FIG. 2, the color correction process operation executed in the color correcting apparatus will be explained.

Figure 1B:
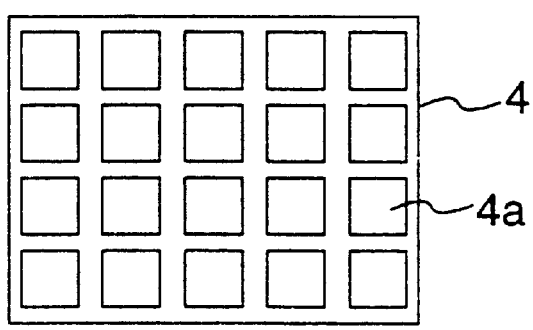
FIG. 1B illustratively indicates a reference color chip.

First of all, a reference color chip 4 as indicated in FIG. 1B is prepared. A plurality of color chips 4a are formed on the reference color chip 4, and these color chips 4a are selected in such a manner that several sorts of colors can be uniformly arranged over the entire space. This reference color chip 4 is read by the color image scanner 1, so that input color signals (Rsi, Gsi, Bsi) of the reference color chip 4 are produced, to which the color correction process operation is not performed. In the input color signal, symbol "i" is integers of "0" to "n" corresponding to the color chips 4a, and symbol "n" represents a total number of color chips 4a.

Next, measurement values (Rmi, Gmi, Bmi) are entered into the computer 2, which are produced by measuring the respective color chips 4a of the reference color chip 4 by a calorimeter. In this computer 2, the input color signals (Rsi, Gsi, Bsi) entered from the color image scanner 1, and also the measurement values (Rmi, Gmi, Bmi) produced by the calorimeter are stored with establishing a corresponding relationship between these input color signals and measurement values to thereby form a first reference table 5. FIG. 3 schematically indicates a structure of this first reference table 5. It should be noted that the measurement values correspond to the NTSC-R, G, B values (step S1).

When the first reference table 5 is formed, a process operation for forming a second process table by executing the below-mentioned process operation is commenced.

Figure 4:
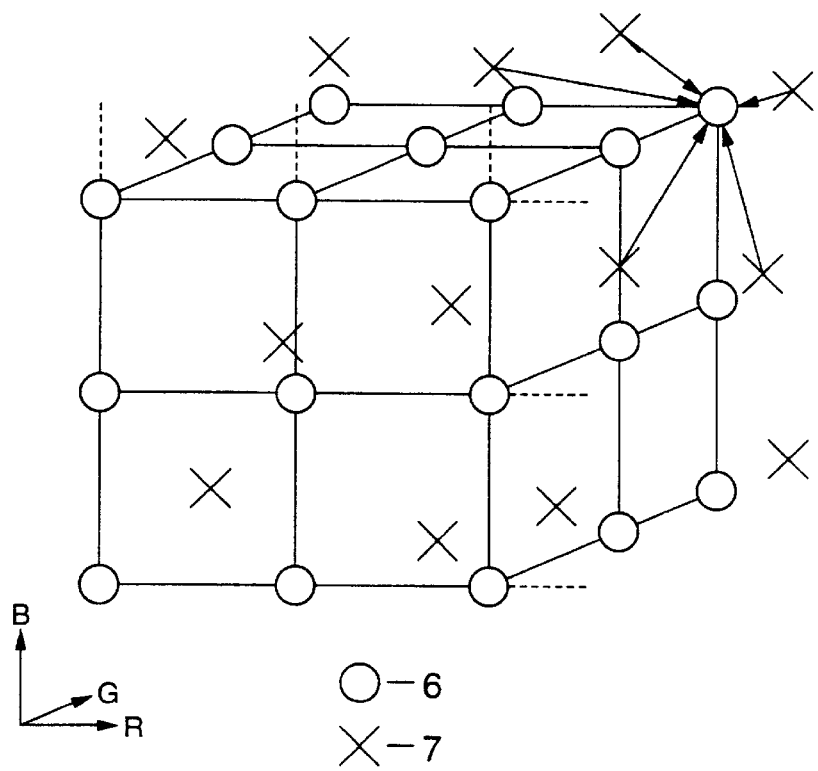
FIG. 4 is a schematic diagram for representing a concept of a color space.

FIG. 4 schematically illustrates a concept of a color space. A color space corresponds to a three-dimensional space for representing a color, namely R (red), G (Green), and B (blue) are plotted as the respective coordinate axial components in an orthogonal coordinate system, and coordinate positions indicate the R, G, B colors, respectively. In FIG. 4, symbol "○" indicates a coordinate point of color data of a lattice point 6, and symbol "×" denotes a coordinate point 7 of input color signals (Rsj, Gsj, Bsj) of the reference color chip 4. Thus, color data (Ri, Gi, Bi) corresponding to the lattice points 6 set to predetermined positions within the color space are firstly entered into a second reference table (step S2).

Next, the input color signals (Rsj, Gsj, Bsj) of the first reference table 5 are sequentially derived, and then distances "d" between the input color signals (Rsj, Gsj, Bsj) of this reference color chip 4 and the color data (Ri, Gi, Bi) of the lattice point are calculated based on the formula (1) $((Rsi-Ri)^2+(Gsj-Gi)^2+(Gsj-Gi)^2)^{1/2}$. Thus, more than four sets of the input color signals (Rsi, Gsi, Bsi) of the reference color chip in which more than four distances "d" are ordered from the smallest value are retrieved.

In this case, more than 4 sets of input color signals (Rsj, Gsj, Bsj) of the reference color chip are retrieved, taking account of the fluctuations in the reading characteristic of the color image scanner 1 (step S3).

Since the above-described process operation is carried out, coordinate points 7 of more than 4 sets of input color signals (Rsj, Gsj, Bsj) for the reference color chip are retrieved around the coordinate point 6 of the color data (Ri, Gi, Bi) of the respective lattice points.

Furthermore, based upon the retrieved input color signals (Rsj, Gsj, Bsj) and the measurement values (Rmi, Gmi, Bmi) corresponding thereto, a calculation is made of transformation coefficients from the input color signals (Rsj, Gsj, Bsj) into the measurement values (Rmi, Gmi, Bmi) corresponding thereto by using the method of least squres. The transformation coefficients may be obtained as a transformation matrix of 3-row×3-column (step S4).

Moreover, the transformation matrix calculated at the above step is applied to the lattice point data (Ri, Gi, Bi) so as to calculate transformed values R'i, G'i, B'i. These transformed lattice point data R'i, G'i, B'i are saved in the second reference table in correspondence with the original lattice point data (Ri, Gi, Bi) (step S5).

In addition, a check is made as to whether or not the process operations defined from the above-described steps S2 to S5 are carried out with respect to all of the lattice point data (step S6). When the process operations for all of the lattice point data are not yet completed, the color correction process operation is returned to the previous step S2 and then the process operations defined from this step S2 upto the step S5 are repeatedly performed. Conversely when the process operations for all of the lattice point data are accomplished, the color correction process operation is advanced to the following steps.

Since the above-described process operations are executed, the formation of the second reference table used to color-correct the image data inputted from the color image scanner 1 is accomplished. As a result, an image input process operation from the color image scanner 1 is commenced.

Into the color correcting apparatus, input color signals (rii, gii, bii) of a color image read by the color image scanner 1 are entered (step S7).

Next, the entered input color signals (rii, gii, bii) are transformed into output color signals (roi, goi, boi) of NTSC-RGB by way of the three-dimensional reference table interpolating method with employment of the second reference table (step S8).

In addition, another check is made as to whether or not the transformation process operation is performed with respect to all of the color image data. If this transformation process operation is not yet accomplished, then the color correction process operation is returned to the step S7 at which the process operation of the step S8 is repeatedly performed. Conversely when all of the process operations are completed, this color correction process operation is accomplished (step S9).

With execution of the above-described process operations, the color correction process operation can be carried out in high precision over the color space with respect to the image data entered from the color image scanner 1.

Figure 5:
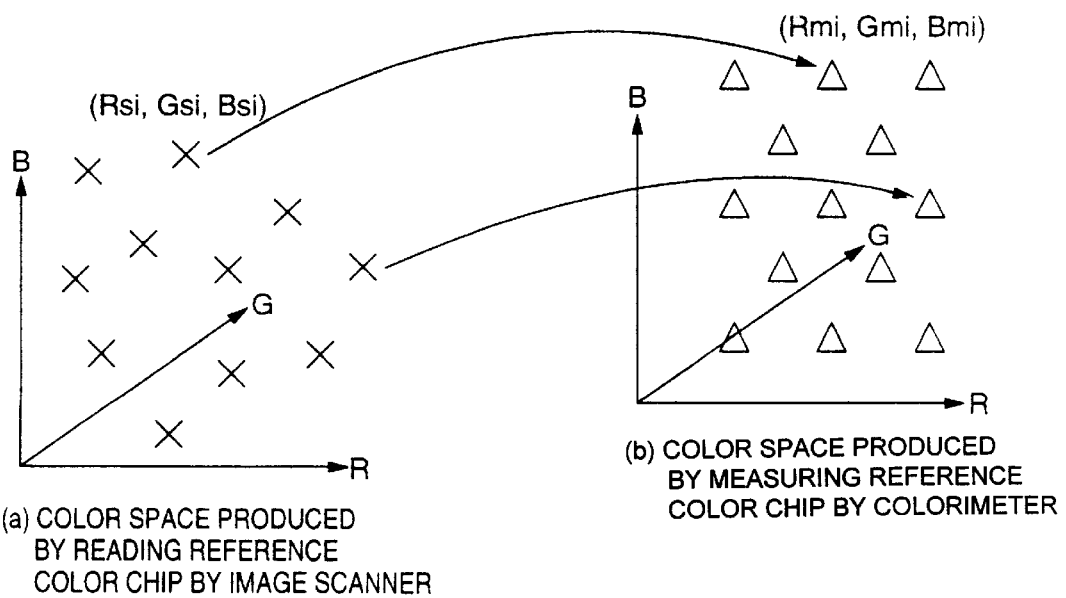
FIG. 5 is an illustration for explaining data acquired by reading the reference color chip by an image scanner, and data measured by a calorimeter.
Figure 6:
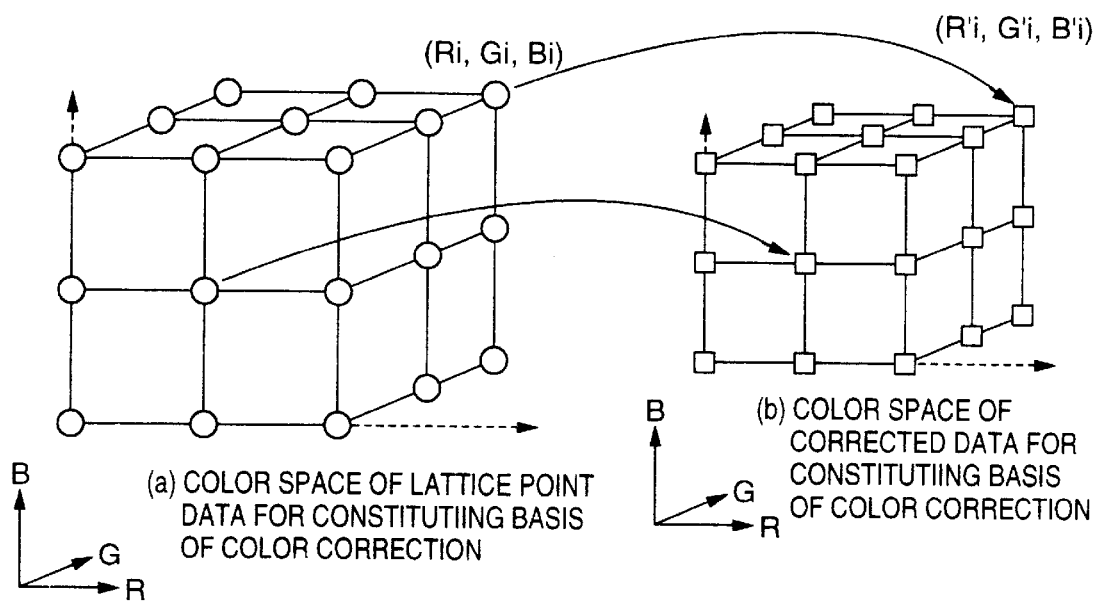
FIG. 6 is an illustration for explaining a color space of lattice data which constitutes a reference of color correction, and correction data for this lattice data.
Figure 7:
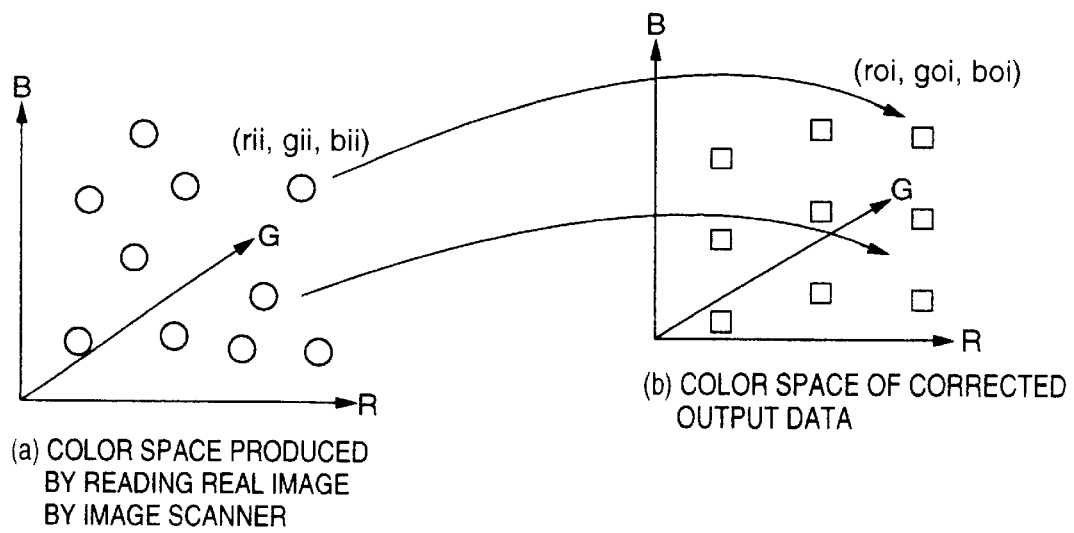
FIG. 7 is an illustration for explaining a color space produced by reading a point image by an image scanner, and output data after correction.

Referring now to drawings of color spaces, the above described color correction sequence will be explained. FIG. 5 is a diagram for schematically indicating a color space (a) made by reading the reference color chip, and another color space (b) made by measuring the reference color chip by the calorimeter. In this drawing, symbol "x", indicates color data read by the color image scanner, and symbol "Δ" represents color data measured by the perceived color chip. FIG. 6 is a diagram for schematically indicating a color space (a) of lattice point data used in a color correction, and another color space (b) of correction data. In this drawing, symbol "○" shows ideal lattice point data of the color image scanner, and symbol "□" indicates lattice point data produced by correcting the ideal lattice point data of the color image scanner. FIG. 7 is a diagram for showing a color space (a) produced by reading an actual image by the color image scanner, and another color space (b) of the corrected output data. In this drawing, symbol "●" shows color data read by the color image scanner, and symbol "■" indicates corrected color data. It should be understood that FIG. 5(a), FIG. 6(a), and FIG. 7(a) indicate the same dimensional color spaces, and further FIG. 5(b), FIG. 6(b), FIG. 7(b) show the same dimensional color spaces.

In general, since a reading characteristic of a color image scanner functioning as a color image input appliance is different from an output characteristic of a printer functioning as an image output appliance, it is required to correct the reading characteristic of this color image scanner. In this embodiment, a scanner reading signal is corrected by the measurement value of the calorimeter defined by CIE.

To this end, as indicated in FIG. 5, both the color data (Rsi, Gsi, Bsi) produced by reading the reference color chip by the color image scanner, and the color data (Rmi, Gmi, Bmi) produced by measuring the reference color chip by the calorimeter are expanded on the color space. A corresponding relationship among the color data of the respective color spaces is formed as the first reference table.

Next, more than 4 sets of color data (Rsi, Gsi, Bsi) indicated by symbol "x", which are located apart from the lattice point data (Ri, Gi, Bi) shown in FIG. 6(a) from the close positions are extracted from the color space of FIG. 5(a). Then, the color data (Rmi, Gmi, Bmi) indicated by symbol "Δ" and corresponding to these color data (Rsi, Gsi, Bsi) are extracted from the first reference table. Then, transformation coefficients from the respective color data (Rsi, Gsi, Bsi) to the color data (Rmi, Gmi, Bmi) are calculated by using the method of least squares.

In FIG. 6, the above-explained transformation coefficients are multiplied with the respective lattice point data indicated by symbol "○" of FIG. 6(a) to thereby obtain the corrected lattice point data indicated by symbol "□" of FIG. 6(b). Then, the lattice point data of FIG. 6(a) are used to form the second reference table in correspondence with the lattice point data of FIG. 6(b). As a result, the color transformation based on the reference color chip of FIG. 5 is applied to the color transformation of the lattice point data shown in FIG. 6, which constitutes a basis in such a case that the actual image will be color-transformed later.

Finally, in FIG. 7(a), the actual image is read by the color image scanner, and the above-explained second reference table is applied to the respective color data shown by symbol "●" so as to correct these color data by way of the three-dimensional reference table interpolation method. Then, as indicated in FIG. 7(b), the finally color-corrected data are outputted.

Embodiment 2

The above-explained color correcting apparatus, according to the first embodiment, is arranged by that every time the reference color chip 4 is read by the color image scanner 1, the content of the first reference table 5 is updated so as to execute the color correction. In contrast, a color correcting apparatus, according to a second embodiment, is arranged by that only when a value produced by reading the reference color chip 4 by the color image scanner 1 is shifted from a preselected range, the content of the first reference table 5 is updated to execute the color correction.

Figure 8:
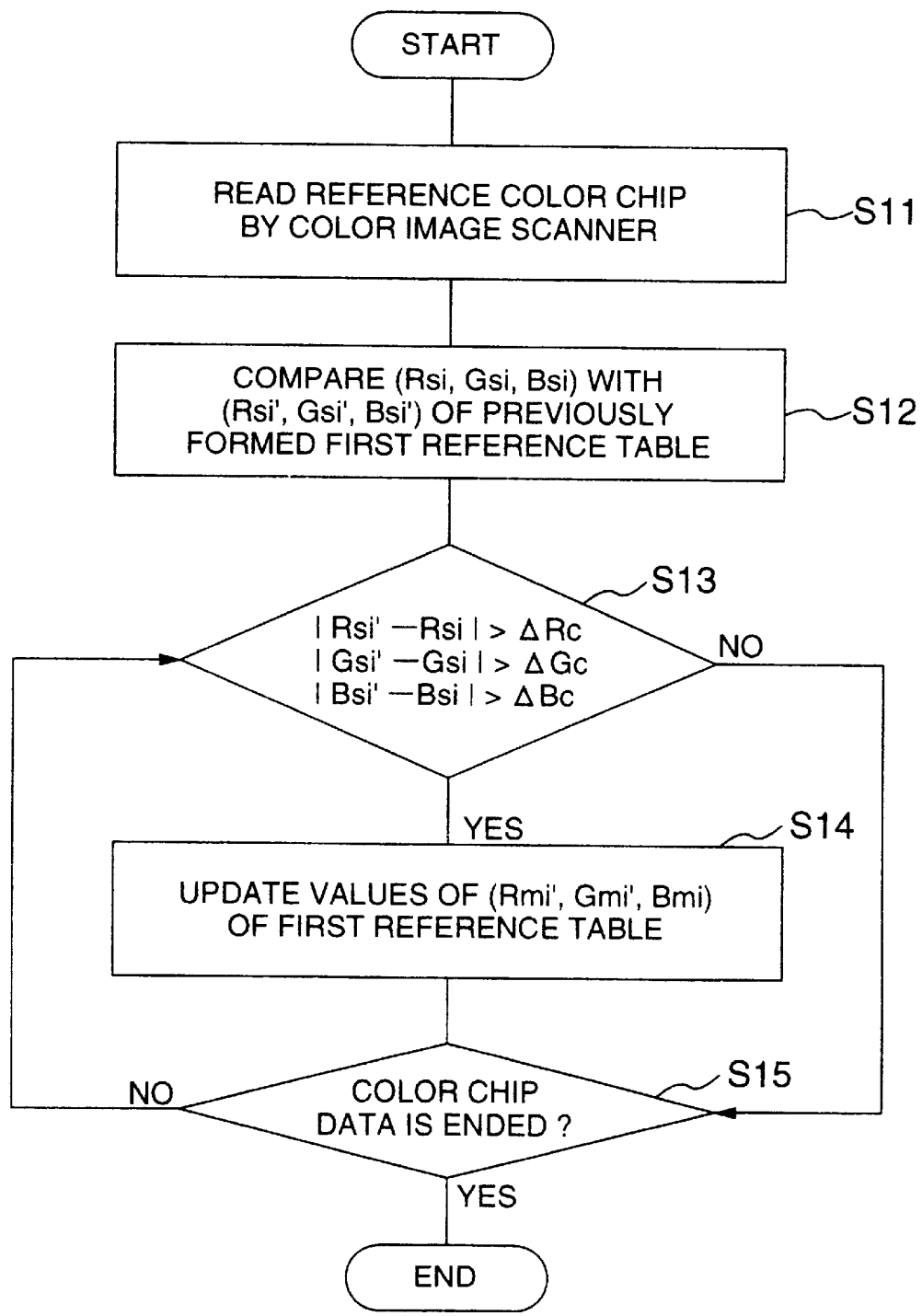
FIG. 8 is a flow chart for describing operations of a color correcting apparatus according to a second embodiment of the present invention.

FIG. 8 is a flow chart for describing operations of this color correcting apparatus according to the second embodiment. In this second embodiment, a description will now be made of different color correction operations from those of the color correcting apparatus according to the first embodiment.

First, the reference color chip 4 is read by the color image scanner 1 to thereby acquire input color signals (Rsi', Gsi', Bsi') (step S11).

Next, a calculation is made of a difference between the input color signals (Rsi', Gsi', Bsi') newly read at the above-described step S11, and the input color signals (Rsi, Gsi, Bsi) of the reference color chip of the first reference table (see FIG. 3), which have been previously read by the color image scanner 1 to be stored in the storage apparatus of the computer 2. Then, a judgment indicated in formula (2) |Rsi'−Rsi|>ΔRc |Gsi'−Gsi|>ΔGc |Bsi'−Bsi|>ΔBc is carried out based on this difference (steps S12, S13).

In the case that the difference between both the input color signals is smaller than judging values (ΔRci, ΔGci, ΔBci), the color correction process operation is advanced to a step S15. Conversely, when this difference is larger than the judging values, the input color signals saved in the first reference table 5 are substituted by the newly read input color signals (step S14).

A check is made as to whether or not the above-described process operation is performed with respect to all of the input color signals of the reference color chip. When this process operation is not yet executed for all of the input color signals, the color correction process operation is returned to the step S13 at which the above-explained process operation is repeatedly performed. When all of the process operations are completed, the update process operation of the first reference table 5 is completed.

Thereafter, the process operations defined from the step S2 to the step S9 shown in FIG. 3 are executed.

In the process operations defined from the step S11 to the step S15, very small fluctuations produced during the reading operation by the color image scanner 1 are allowed. As a result, this color correcting apparatus is not excessively brought into such an unstable operation that very small fluctuations are produced every time the image is read by the color scanner 1, so that the color correction process operation can be effectively performed.

Embodiment 3

Figure 9:
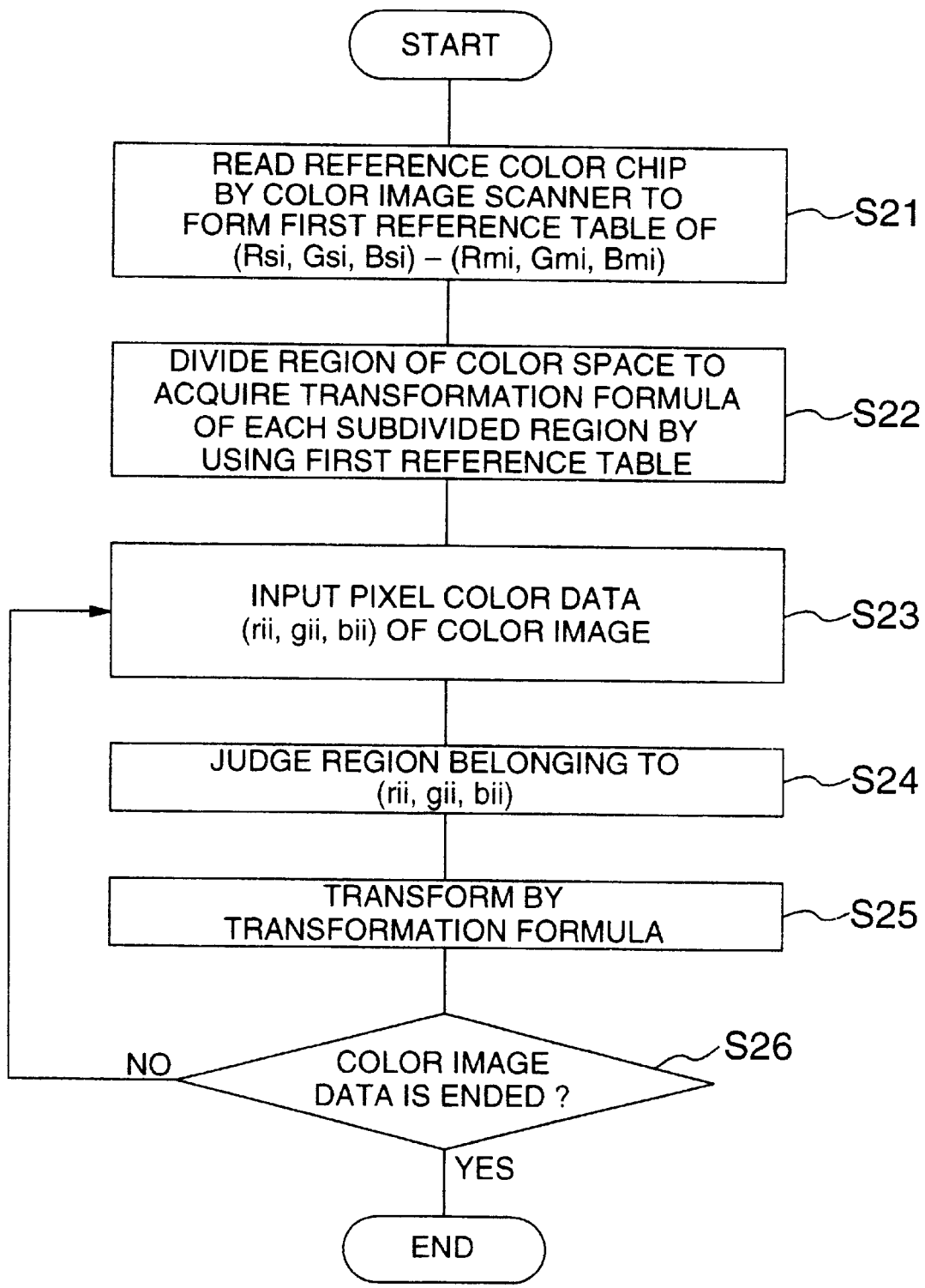
FIG. 9 is a flow chart for describing operations of a color correcting apparatus according to a third embodiment of the present invention.
Figure 10:
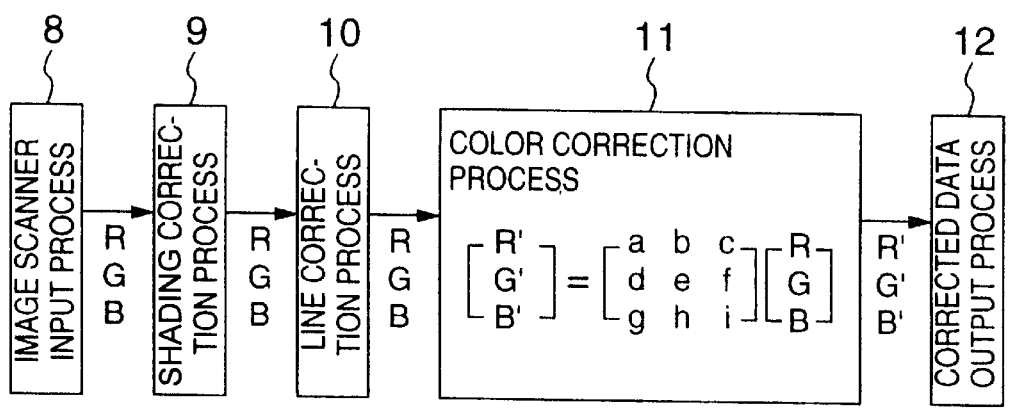
FIG. 10 is an explanatory diagram for explaining the conventional input signal process operation of the color image scanner.

A color correcting apparatus, according to a third embodiment of the present invention, is arranged in such a manner that the color space shown in FIG. 4 is subdivided into a plurality of regions, a transformation coefficient from an input color signal into a measurement value is calculated with respect to each of these subdivided regions, and then the resultant transformation coefficients are used to execute the color correction. FIG. 9 is a flow chart for describing operations by the color correcting apparatus according to the third embodiment.

First, the reference color chip 4 is read by the color image scanner 1 to thereby acquire input color signals (Rs, Gsi, Bsi) of the reference color chip 4. Moreover, measurement values (Rmi, Gmi, Bmi) are acquired by measuring the reference color chip 4 by the calorimeter to thereby form the first reference table 5 (see FIG. 3).

Subsequently, the color space is subdivided into a plurality of regions. The color correction process operations defined from the step S2 to the step S5 shown in FIG. 2 are carried out with employment of the input color signals (Rsi, Gsi, Bsi) and the measurement values (Rmi, Gmi, Bmi), corresponding to the respective subdivided regions, which are derived from the first reference table 5. As a result, the second reference table is calculated with respect to each of the subdivided regions obtained by subdividing the color space (step S22).

Next, input color signals (ri, gi, bi) of a color image is acquired from the color image scanner 1 (step S23).

Then, the transformation coefficients corresponding to the judged region are derived from the second reference table, and the input color signals of the pixels are converted to execute the color correction (step S25).

Next, a check is made as to whether or not the transformation process operation for all of the color image data is accomplished. If this transformation process operation is not yet completed, then the color correction operation is returned to the step S23 at which the above-described process operation is repeatedly performed. If this process operation is accomplished, then the color process operation for the color image is ended (step S26).

As described above, since the color space is subdivided into a plurality of subregions and the transformation coefficients for color corrections are set to each of the subdivided regions, the color correction can be carried out in high precision in response to the perceiver color.

It should be noted that the above-explained color correcting apparatuses according to the embodiments 1 to 3 may be arranged by employing not only the software, but also the hardware.

In accordance with the present invention, since the transformation coefficients are set in accordance with the reading errors over the entire color space, the color corrections can be achieved in high precision.

What is claimed is:

1. A color correcting apparatus for correcting color data of an image inputted from an image input apparatus for reading a color image in accordance with a reading characteristic of said image input apparatus, comprising:

calculating means for calculating a transformation coefficient used to transform input data of a reference color into normal data based upon the input data of the reference color and the normal data indicative of a reference color of a reference color chip, said input data of the reference color being produced by reading the reference color chip having the reference color located near a lattice point defined within a color space by employing said image input apparatus;

lattice point correcting means having a combination, as a table, of color data at the lattice point obtained by transforming said color data with employment of said transformation coefficient outputted from said calculating means; and color correcting means for correcting the color data of the image inputted from said image input apparatus by way of a table interpolation method with employment of the table in said lattice point correcting means, to output the corrected color data.

2. A color correcting apparatus for correcting color data of an image inputted from an image input apparatus for reading a color image in accordance with a reading characteristic of said image input apparatus, comprising:

calculating means for calculating a transformation coefficient used to transform input data of a reference color into normal data based upon the input data of the reference color and the normal data indicative of a reference color of a reference color chip, said input data of the reference color being produced by reading the reference color chip having the reference color located near a lattice point defined within a color space by employing said image input apparatus;

lattice point correcting means for correcting the color data at the lattice point of said color space by using said transformation coefficient;

color correcting means for correcting the color data of the image inputted from said image input apparatus with employment of the corrected color data of the lattice point;

judging means for, every time input data of the reference color of said reference color chip is entered from said image input apparatus, comparing the input data of said reference color which has been previously inputted with the input data of said reference color which is newly inputted, so as to judge as to whether or not a difference between both said input data exceeds a predetermined range;

storage means for storing therein the newly entered input data of said reference color when said difference exceeds said predetermined range, whereby:

said calculating means calculates said transformation coefficient by using the input data of said reference color stored in said storage means.

3. A color correcting apparatus for correcting color data of an image inputted from an image input apparatus for reading a color image in accordance with a reading characteristic of said image input apparatus, comprising:

calculating means for calculating a transformation coefficient used to transform input data of a reference color into normal data with respect to each of subdivided regions obtained by subdividing a color space based upon the input data of the reference color and the normal data indicative of a reference color of a reference color chip, said input data of the reference color being produced by reading the reference color chip having the reference color located near a lattice point defined within said color space by employing said image input apparatus;

lattice point correcting means having a combination, as a table, of color data at a lattice point contained in said subdivided regions and corrected color data of the lattice point obtained by transforming said color data with employment of said transformation coefficient, outputted from said correcting means, at the region in which said lattice point is contained;

judging means for judging said subdivided regions in which pixel data of the image inputted from said image input apparatus is contained; and color correcting means for correcting the color data of said pixel by way of a table interpolation method with employment of the table contained in said lattice point correcting means of said region judged by said judging means, to output the corrected color data.

* * * * *